United States Patent
Alejandro et al.

(10) Patent No.: US 12,554,824 B2
(45) Date of Patent: Feb. 17, 2026

(54) USER ACCESS TO FUNCTIONALITY OF A DOCKED TABLET COMPUTING DEVICE

(71) Applicant: Google LLC, Mountain View, CA (US)

(72) Inventors: Xiomara Alejandro, Austin, TX (US); Carol Kotermanski, New York, NY (US); Marten Andreas Jonsson, London (GB); Roger Graves, San Carlos, CA (US); Artur Tsurkan, Mountain View, CA (US); Prabhu Balasubramanian, Cupertino, CA (US); Lauren Wunderlich, Mountain View, CA (US); Esther Leong, Cave Creek, AZ (US)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 18/416,694

(22) Filed: Jan. 18, 2024

(65) Prior Publication Data

US 2025/0238495 A1 Jul. 24, 2025

(51) Int. Cl.
*G06F 21/62* (2013.01)
*G06F 1/16* (2006.01)
*G06F 21/34* (2013.01)

(52) U.S. Cl.
CPC ............ *G06F 21/34* (2013.01); *G06F 1/1605* (2013.01); *G06F 1/1632* (2013.01); *G06F 21/6245* (2013.01)

(58) Field of Classification Search
CPC ........ G06F 1/16; G06F 1/1601; G06F 1/1605; G06F 1/1632; G06F 21/60; G06F 21/62; G06F 21/6218; G06F 21/6245
See application file for complete search history.

(56) References Cited

U.S. PATENT DOCUMENTS

| | | | |
|---|---|---|---|
| 10,412,206 B1* | 9/2019 | Liang | H04M 3/42068 |
| 2014/0196112 A1* | 7/2014 | Huang | H04W 12/06 726/3 |
| 2014/0297897 A1* | 10/2014 | Halim | G06F 13/409 710/14 |
| 2021/0048944 A1* | 2/2021 | Chandrababu | H04W 4/80 |

* cited by examiner

Primary Examiner — D'Arcy Winston Straub
(74) Attorney, Agent, or Firm — Lerner David LLP

(57) ABSTRACT

Various techniques for directed to unauthenticated and authenticated users accessing functionality of a docked computing device. The techniques are directed to allowing unauthenticated users (e.g., family members, friends, . . . ) to access to selected functionality types provided by the computing device even though the tablet is locked. As an example, while the tablet is docked and locked, unauthenticated users can access selected functionality types provided by the computing device such as, but not limited to, the ability to listen to music, stream videos, ask for timers, set reminders, ask for facts from a virtual assistant, and the like.

20 Claims, 10 Drawing Sheets

USER ACCESS TO FUNCTIONALITY OF A DOCKED TABLET COMPUTING DEVICE

BACKGROUND

Electronic devices, such as laptop computers, tablet computers, smart phones, allow a user to access many different applications and services. In many cases, these electronic devices are configured to allow access for authenticated users and prevent access by unauthenticated users. For example, a smart phone or tablet computer, may automatically lock when not in use after some period of inactivity. While the device is locked, neither authorized users nor unauthorized users can access functionality of the device. To access the functionality provided by the device, the authorized user unlocks the device by providing authentication information (e.g., password, facial recognition, fingerprint recognition, . . . ).

SUMMARY

Various embodiments for user access to functionality of a docked tablet are described herein. Using the techniques described herein, a computing device, such as a tablet, includes functionality that when docked and locked to a docking device allows unauthenticated users (e.g., family members, friends, visitors, . . . ) access to some functionality types provided by the computing device. As an example, while a tablet is docked and locked, both authenticated and unauthenticated users may have the ability to listen to music, stream videos, ask for timers, set reminders, ask for facts from a virtual assistant, and the like. In some configurations, the device remains locked while providing access to the available functionality types. In this way, unauthenticated users do not have access to data and/or functionality types associated with an authenticated user of the tablet.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that includes detecting that a tablet computing device is docked to a docking device. The method also includes in response to detecting that the tablet computing device is docked, changing an operating mode setting of the tablet computing device to a docked mode that allows one or more unauthenticated users to interact with the tablet computing device during a time the tablet computing device is in a locked state. The method also includes receiving input from an unauthenticated user to access an application provided by the tablet computing device. The method also includes causing content to be provided, using the tablet computing device, to the unauthenticated user. Other embodiments of this aspect include corresponding computer systems, apparatus, and computer programs recorded on one or more computer storage devices, each configured to perform the actions of the methods.

Implementations may include one or more of the following features. The method may include changing a display mode of the tablet computing device to an always-on display mode in response to detecting the tablet computing device is docked. The one or more user interface elements are selectable by an authenticated user. The one or more user interface elements are associated with one or more of interacting with one or more home devices, interacting with media content, setting an alarm, setting a timer, browsing, and playing audio content, adjusting one or more thermostats, browsing and playing video content, or performing a search. The docking device includes a power source, one or more speakers, and an interface configured to electronically connect to the tablet computing device. The method may include restricting the unauthenticated user from accessing private content on the tablet computing device that is associated with an authenticated user of the tablet computing device. The method may include determining that one or more of the tablet computing device or the docking device is located within a trusted location; and providing access to one or more of data, applications, or services associated with the trusted location. The one or more of data, applications, services associated with the trusted location includes data associated with home devices that are located in an environment at the trusted location. Receiving input from the unauthenticated user may include receiving one or more of voice input, or touch input via the tablet computing device. The method may include receiving second input from an authenticated user; and outputting personalized content for the authenticated user. Implementations of the described techniques may include hardware, a method or process, or computer software on a computer-accessible medium.

One general aspect includes a system. The system can include a docking device. The system also includes a computing device that includes: a touch surface, a wireless interface configured to receive and transmit wireless data from one or more smart devices. The system also includes one or more processors configured to: detect that the computing device is docked to the docking device; in response to detecting that the computing device is docked, change an operating mode of the computing device to a docked mode that allows one or more unauthenticated users to interact with the computing device during a time the computing device is in a locked state and change a display mode of the computing device to an always-on display mode; receive input from an unauthenticated user to access functionality provided by the computing device; and cause content to be provided, using the computing device, to the unauthenticated user. Other embodiments of this aspect include corresponding computer systems, apparatus, and computer programs recorded on one or more computer storage devices, each configured to perform the actions of the methods.

Implementations may include one or more of the following features. The system where the one or more processors are further configured to display one or more user interface elements on a display associated with the computing device, where the one or more user interface elements are selectable by an authorized user. The one or more user interface elements are associated with one or more of interacting with one or more home devices, interacting with media content, setting an alarm, setting a timer, browsing, and playing audio content, adjusting one or more thermostats, browsing and playing video content, or performing a search. The docking device includes a power source, one or more speakers, and an interface configured to electronically connect to the computing device. The one or more processors are further configured to restrict the unauthenticated user from accessing private content on the computing device that is associated with an authenticated user of the computing device. The one or more processors are further configured to: determine that one or more of the tablet computing device or the docking device is located within a trusted location; and provide access to one or more of data, applications, or services associated with the trusted location. The one or more of data, applications, services associated with the trusted location includes data associated with home devices that are located in an environment at the trusted location. Receiving input from the unauthenticated user may include receiving one or more of voice input, or touch input via the computing device. The system may include receiving second input from an authorized user; and outputting personalized content for the authorized user. Implementations of the described techniques may include hardware, a method or process, or computer software on a computer-accessible medium.

One general aspect includes a non-transitory computer-readable medium containing computer executable instructions that when executed include detecting that a tablet computing device is one or more of docked to a docking device, or in a trusted location. The instructions also include in response to detecting that the tablet computing device is one or more of docked to the docking device or in the trusted location, changing an operating mode setting of the tablet computing device to a docked mode that allows one or more unauthenticated users to interact with the tablet computing device during a time the tablet computing device is docked and in a locked state. The instructions also include receiving input from an unauthenticated user to access an application provided by the tablet computing device. The instructions also include causing content to be provided, using the tablet computing device, to the unauthenticated user. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
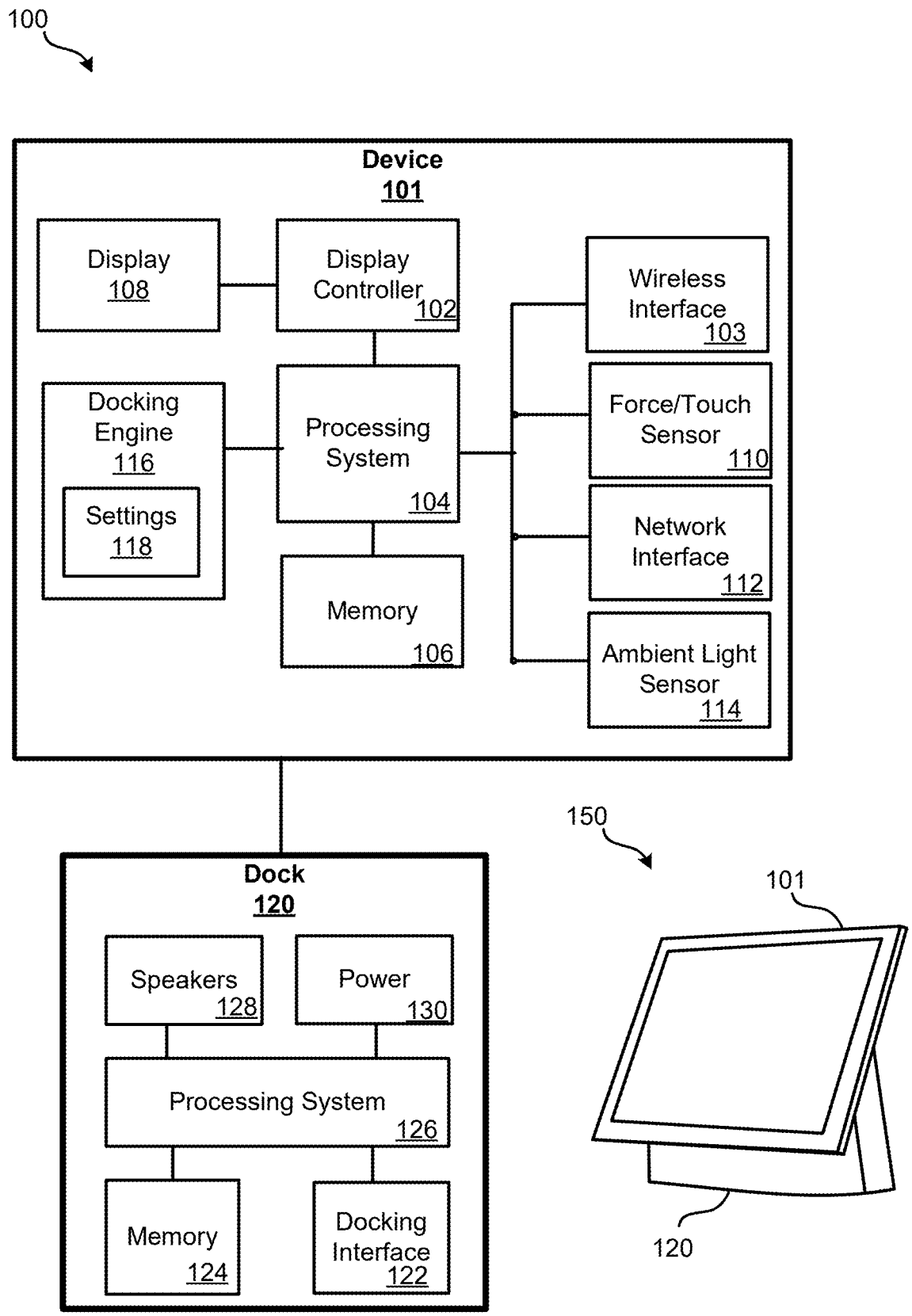
FIG. 1 illustrates a system in which a computing device is docked, according to some embodiments.

Techniques are described herein that are directed to unauthenticated and authenticated users accessing functionality of a docked computing device, such as a tablet computing device. The techniques are directed to allowing unauthenticated users (e.g., family members, friends, . . . ) to access to selected functionality types provided by the computing device even though the computing device is locked. As an example, while the tablet is docked and locked, unauthenticated users can access selected functionality types provided by the computing device such as, but not limited to, the ability to listen to music, stream videos, ask for timers, set reminders, ask for facts from a virtual assistant, and the like.

As used herein, the terms "locked", "lockscreen", or "screen locked" refers to a computing device that prevents unauthorized access by requiring a user to unlock the computing device using an authentication technique (e.g., password, PIN, pattern match, biometric, . . . ). The term "docked" means that a computing device, such as a tablet computing device, is connected to a dock. Different docks may have different components and/or functionality. For example, docks and/or tablets may have built-in speakers, microphones, power, ports/connectors (e.g., display, charging, USB, . . . ), displays, radios, and the like. The term "authenticated user" refers to a user that has an account associated with the docked computing device. An "unauthenticated user" refers to a user that does not have an account on the docked computing device or has yet to authenticate/log in to their account.

According to some examples, in response to being docked, the computing device is automatically placed into a docked mode. When the device is in docked mode, both authenticated users and unauthenticated users can enjoy content provided by the device. For example, both authenticated and unauthenticated users can enjoy features provided by the device such as but not limited to an always-on display that displays photos, streams music, shows selected content (e.g., weather, smart device information, photos, . . . ), provides hands-free help from a virtual assistant, allows easy control of smart devices in the environment, and provides rich media experiences that integrate seamlessly with other devices. Since, in some examples, the device remains locked while in docked mode unauthenticated users are prevented from accessing personal/private data and/or functionality types associated with an authenticated user's profile of the tablet.

According to some examples, while in docked mode, the device may display different content (e.g., screen savers, UI elements, content, proactive updates, . . . ). For instance, the proactive updates can relate to reminders, calendar events, notifications, security events, traffic updates, and the like. In some cases, the computing device may replace the currently displayed content with a full screen display of content related to a detected event (e.g., doorbell, timer, alarm, . . . ). In some configurations, users can configure what is shown/accessible/available in the UI within system settings and/or other settings.

In some examples, users can request to play/interact with different types of media, such as but not limited to music, radio, video, news, podcasts, and the like while the device is locked and in docked mode. According to some configurations, the device may identify that the request comes from an authenticated user (e.g., by voice recognition or some other technique). When the device identifies that the request comes from an authenticated user, the device may provide access to personalized content of the user (e.g., personal playlists, personal data, . . . ). According to some examples, when the user is not identified as an authenticated user, the device provides non-personalized content. In some examples, the device may display content received from another device. For instance, a user may "cast" content from another device (e.g., a smart phone, another tablet, . . . ) to the display of the computing device while operating in docked mode. In some configurations, users can issue play, pause, and other playback controls using voice input, touch input, or some other type of input. In some cases, the controls can be UI elements that are displayed on the screen of the docked device, or on a different screen.

Many types of computing devices can benefit from the use of the techniques described herein. For example, tablets, smartphones, and other types of computing devices may benefit from various embodiments of the docking techniques as detailed herein. Furthermore, the techniques described herein may include the docked computing device communicating with different devices, services, and/or applications, such as but not limited to an assistant device (e.g., Google® Nest® Hub; Google® Nest® Hub Max); a home automation controller (e.g., controller for an alarm system, thermostat, lighting system, door lock, motorized doors, etc.); a gaming device (e.g., a gaming system, gaming controller, data glove, etc.); a communication device (e.g., a smart phone such as a Google® Pixel® Phone, cellular phone, mobile phone, wireless phone, portable phone, radio telephone, etc.); and/or other computing device (e.g., a tablet computer such as the Pixel® Tablet, phablet computer, notebook computer, laptop computer, etc.).

Further details regarding such embodiments and others is provided in relation to the figures. FIG. 1 illustrates a system 100 in which a computing device 101 is docked, according to some embodiments. System 100 includes dock 120 and device 101. Some components of device 101 and dock 120 are illustrated. Device 100 can include: a display controller 102; processing system 104; memory 106; display 108; force/touch sensor 110; network interface 112, ambient light sensor 114, wireless interface 103, docking engine 116, settings 118, as well as other components/functionality not shown. Dock 120 can include: docking interface 122; memory 124; processing system 126; speakers 128; and power 130. All components of the dock 120 can be housed by housings of the dock, which can be made from a rigid or semi-rigid material. Different docks 120 may have different components and functionality. For example, docks may have built-in speakers, microphones, power, ports/connectors (e.g., display, charging, USB, . . . ), displays, radios, and the like. Element 150 shows device 101 docked to a dock 120.

Docking interface 122 includes one or more connections configured to physically and electronically couple device 101 to the dock 120. Generally, the docking interface 122 includes components that allow the device 101 and the dock 120 to work as a single unit. For example, while the device 101 is docked to dock 120, the device 101 may use functionality provided by the dock 120, such as but not limited to power 130, speakers 128, microphones (not shown), processing system 126, memory 124, and the like.

In some examples, device 101 is a tablet computing device that can connect to one or more networks and communicate with one or more other computing devices, such as smart computing devices. In some implementations, an environment can include intelligent, multi-sensing, network-connected devices that integrate seamlessly with each other in a smart-home network and/or with a central server or a cloud-computing system to provide a variety of useful smart-home functions. Any network-connected or network-connectable device having processing capabilities, and optionally also sensing capabilities, and that is deployed or is suitable for being deployed in an environment, such a home environment, so that the device may be controlled via a wired and/or wireless network and may optionally interact with one or more other such devices may be referred to as a "smart-home device" or "smart device".

Device 101 may include a processing system 104 that includes one or more processors that may execute special-purpose software stored in a memory 106. Processing system 104 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD).

In some embodiments, device 101 may connect to one or more other computing devices via network interface 112, and/or wireless interface 103. For example, device 101 may use network interface 112/wireless interface 103 to connect with mobile computing devices, tablet computing devices, server computing devices, and the like. Devices may further communicate with each other via a connection (e.g., network interface 112) to a network, such as the Internet (not shown). Through the Internet, the smart devices may communicate with a server system, such as server system (not shown) (also called a central server system and/or a cloud-computing system herein). The server system may be associated with a manufacturer, support entity, or service provider associated with the smart device(s). In some implementations, software updates are automatically sent from the server system to devices (e.g., when available, when purchased, or at routine intervals).

Device 101 can include one or more sensors, such as a force/touch sensor 110 (which may be referred to herein as a "force touch sensor", an ambient light sensor 114, as well as other sensors. Ambient light sensor 114 may sense the amount of light present in the environment of device 101. Measurements made by ambient light sensor 114 may be used to adjust the brightness of electronic display 108. For example, the display controller 102 may use data from the ambient light sensor 114 to detect light conditions and adjust the brightness of the display 108 based on the detected light conditions. In some embodiments, ambient light sensor 114 senses an amount of ambient light through a cover (not shown). Therefore, compensation for the reflectivity of the cover may be made such that the ambient light levels are correctly determined via ambient light sensor 114. A light pipe may be present between ambient light sensor 114 and the cover such that in a particular region of the cover, light that is transmitted through the cover, is directed to ambient light sensor 114, which may be mounted to a printed circuit board (PCB), such as a PCB to which processing system 104 is attached. In some examples, the device 101 may also include one or more sensors that can be used to determine user presence, proximity, and/or interaction with the device 101.

Processing system 104 may output information for presentation to electronic display 108. Processing system 104 can receive information from force touch sensor 110, ambient light sensor 114, dock 120, other devices (e.g., smart devices) and in some examples from one or more other sensors. Processing system 104 can perform bidirectional communication with network interface 112/wireless interface 103.

In some embodiments, processing system 104 executes one or more software applications or services stored on or otherwise accessible by device 101. For example, one or more components of device 100, such as display controller 102, may include one or more software applications or software services that may be executed by processing system 104. In some configurations, the one or more software applications may include processing functionality configured to perform operations described herein.

Display 108 may be a light-emitting diode (LED) display, an organic light-emitting diode (OLED) display, or other suitable display. In some examples, display 108 includes pixels that can be individually turned on or off. Display 108 may be rectangular and may have four peripheral edges (e.g., right, left, top, and bottom edges that run around the outer periphery of display 108). Generally, an LED/OLED display includes LEDs/OLEDs configured in a particular pattern (e.g., an x-y grid) that emit light when a voltage is applied to the diode. If an OLED display is used, the organic layers for the OLEDs can be patterned and deposited on a substrate that includes a backplane. The backplane can include switching and driving circuitry for the OLEDs. The substrate can be encapsulated, forming an OLED display. In some implementations, the substrate can include a rigid, non-bendable material such as a rigid glass panel or a rigid plastic panel. In some implementations, the substrate can include a bendable material that can include, but is not limited to, plastic, metal, or flexible glass. OLED displays, dependent on the substrate, can be viewed from both the front and the back of the display.

Force touch sensors 110 may be implemented using capacitive touch sensors, acoustic touch sensors, piezoelectric touch sensors or other force-sensing components, optical touch sensors, resistive touch sensors, or other touch sensitive components. Touch sensors 110 may be implemented in an array of rows and columns (as an example). In a typical scenario, touch sensors 110 may be implemented as an array of capacitive sensor electrodes formed from a conductor such as indium tin oxide and may be integrated into one of the layers of display 108 to form a touch screen display. Other types of configurations may be used if desired (e.g., to implement touch sensitive buttons, to implement one-dimensional sliders based on touch technology, etc.).

In some examples, a docking engine 116 and/or some other device or component, performs operations to allow authenticated users and unauthenticated users (e.g., family members, friends, . . . ) to access at least some of the functionality types provided by the computing device 101 when the device 101 is docked and screen locked. As an example, while the device 101 is docked and screen locked, unauthenticated users can access functionality types provided by the device 101 that are available while in docked mode.

In some configurations, an authorized user (e.g., the primary user that has an account on the device 101) may specify settings 118 associated with operation of the device 101 while in docked mode. According to some examples, the primary user can specify what functionality types are available to unauthenticated users while the device 101 operates in docked mode. In some configurations, the primary user selects functionality types from the available functionality types (e.g., streaming services, alarms, reminders, interaction with a virtual assistant, searching, . . . ) that unauthenticated users are allowed to access while the computing device is in docked mode.

For example, the primary user may specify different screen savers (e.g., images displayed) for the always-on display 108, light settings (e.g., manual or automatic brightness level settings), user interface (UI) elements displayed on home panels, functionality types available while in docked mode, and the like. According to some examples, the primary user can configure the device 101 to display personal photos, other photos, selected backgrounds, clock faces, weather data, and the like. The primary user may also specify settings for music and video services to use while in docked mode. In some examples, a default service can be specified by the primary user that will be used if a particular service is not specified in input (e.g., a voice command) provided to the virtual assistant associated with the device 101. The functionality types that are available to unauthenticated users while in docked mode may be configured by a primary user (e.g., the primary user of the computing device) that can include, but are not limited to video, music, applications, and/or services.

According to some examples, the docking engine 116 places the device 101 into a docked mode in response to identifying that the device 101 is docked to dock 120. As discussed above, when the device 101 is in docked mode, both authenticated users and unauthenticated users can enjoy content provided by the device 101. While the device 101 is in docked mode, the docking engine 116 provides users with selected functionality types and content such as but not limited to an always-on display 108 that displays photos, streams music, shows selected content (e.g., weather, smart device information, photos, . . . ), provides hands-free help from a virtual assistant, allows easy control of smart devices in the environment, and provides rich media experiences that integrate seamlessly with other devices.

In some configurations, unauthenticated users cannot access content and/or functionality types that are private to the authenticated users of device 101. Stated another way, the device 101 remains locked while in docked mode such that unauthenticated users can access selected functionality and content without having the ability to access personal data and/or functionality types associated with an authenticated user of the tablet.

While in docked mode, unauthenticated users do not have access to private user data that belongs to a user profile of an authenticated user. For instance, unauthenticated user access to the selected functionality types and content but is not able to view or modify an authenticated user's data, application preferences, settings, and the like. As an example, while an unauthenticated user may be able to play music available from a music service, the unauthenticated user can be prevented from accessing an authenticated user's playlist.

According to some examples, while in docked mode, the device 101 may display content such as screensavers, notifications, UI elements, other types of content, provide proactive updates and the like. The content can be displayed on display 108 and/or one or more other displays (not shown). For instance, the proactive updates can relate to reminders, calendar events, notifications, security events, traffic updates, and the like, that are associated with the primary user.

In some cases, the docking engine 116 may replace the currently displayed content with a full screen display of content related to a detected event (e.g., doorbell, timer, alarm, . . . ). According to some examples, the device 101 may change the display brightness (e.g., lower the display brightness), in response to one or more detected conditions (e.g., when idle, upon a lighting change, at a specified time, . . . ). When the computing device is in the docked mode, the display of the content can be optimized for viewing from a farther distance as compared to in-hand use.

In some configurations, both authenticated users and unauthenticated users can interact with a virtual assistant while the computing device 101 is in docked mode. For example, a user can interact with the computing device 101 hands-free by talking to the virtual assistant. According to some examples, while in docked mode, the virtual assistant can be configured to provide personal results based on a voice-match with an authenticated user of the computing device 101. For instance, the authenticated user can configure a setting to use personal results when the user is identified.

As briefly discussed above, users can request to play/interact with different types of media, such as but not limited to music, radio, video, news, podcasts, and the like. In some examples, when the user is identified as being an authenticated user (e.g., by voice recognition), the user can request content associated with the user to be played (e.g., playlists). The users can also share a screen with the computing device while in docked mode. For instance, a user may "cast" a mobile phone screen to the display of the computing device 101 while in docked mode. The users can also control active sessions on the device, or remote sessions on the same network. Users can issue play, pause, and other playback controls via voice. In some cases, the controls can be displayed on the lock screen, or on a different screen.

In some configurations, users can view and control their smart home through a home panel. A home panel can be configured to provide a whole/partial home view of devices, with category filters, inline controls, and camera views (Sec FIGS. 3A, 3B, 3C, and 3D for example displays). According to some examples, users can access a home panel through a shortcut UI element, such as shortcut UI element 204 illustrated in FIG. 2, at any time, regardless of whether the device 101 is locked or docked. When the device 101 is idle and locked and docked, users can access the Home Panel through a shortcut on the screensaver.

According to some examples, the docking engine 116, or some other device or component, is configured to determine if the device 101 is in a trusted location. A "trusted location" is a location that has been identified by an authorized user as being associated with the authorized user (e.g., a home environment). When the docking engine 116 determines that the device 101 is in a trusted location, users will have access to more information due to trusted access privileges provided by the docking engine. When the docking engine 116 determines that the device 101 and dock 120 are in an untrusted location, the docking engine 116 can prevent unauthorized users from accessing content and/or functionality provided by the device 101. In some cases, the docking engine 116 may allow unauthorized users access after receiving further input from an authorized user.

Figure 2:
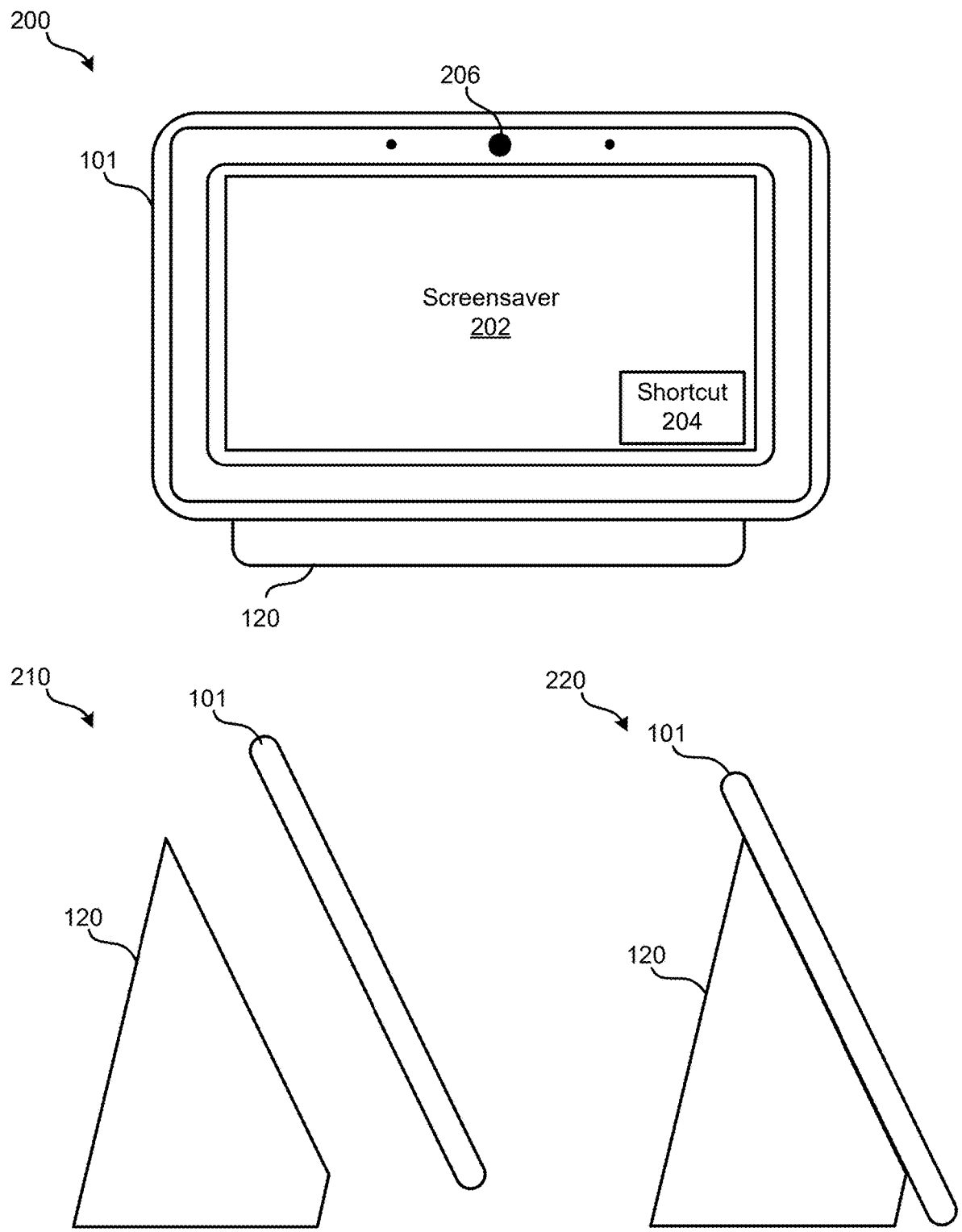
FIG. 2 illustrates a diagram a computing device and a docking device, according to some embodiments.

According to some examples, a screensaver, such as screensaver 202 in FIG. 2, can be displayed while the device 101 is operating in docked mode and no user input is detected for some period of time. To access the functionality provided while in docked mode, users may access a home panel display that includes UI elements by using touch input (e.g., a shortcut UI element displayed on the screen saver) and/or through voice input. As discussed herein, user can access a variety of different functionality while in docked mode. For example, users can use the virtual assistant for hands-free control of their smart home, interact with streaming services, interact with stored media content, set alarms/timers, cast content from another device (e.g., a smartphone) to the display 108 of device 101, and the like.

FIG. 2 illustrates a diagram a computing device 101 and a docking device 120, according to some embodiments. As illustrated, diagram 200 shows a tablet computing device 101 that is docked to dock 120. According to some configurations, the device 101 attaches magnetically to the dock 120. For example, element 210 shows the tablet computing device 101 in an undocked state from the dock 120. To dock the device 101, the user may hold the device 101 and position it so that the device 101 is magnetically connected to the dock 120. Other connections can be used (e.g., connection port, cable, . . . ). Diagram 200 shows that when docked, the camera 206 of the tablet computing device 101 is located on the top. As will be discussed in more detail below, in response to the tablet being docked, the device 101 changes from tablet mode to a docked mode.

Figure 3A:
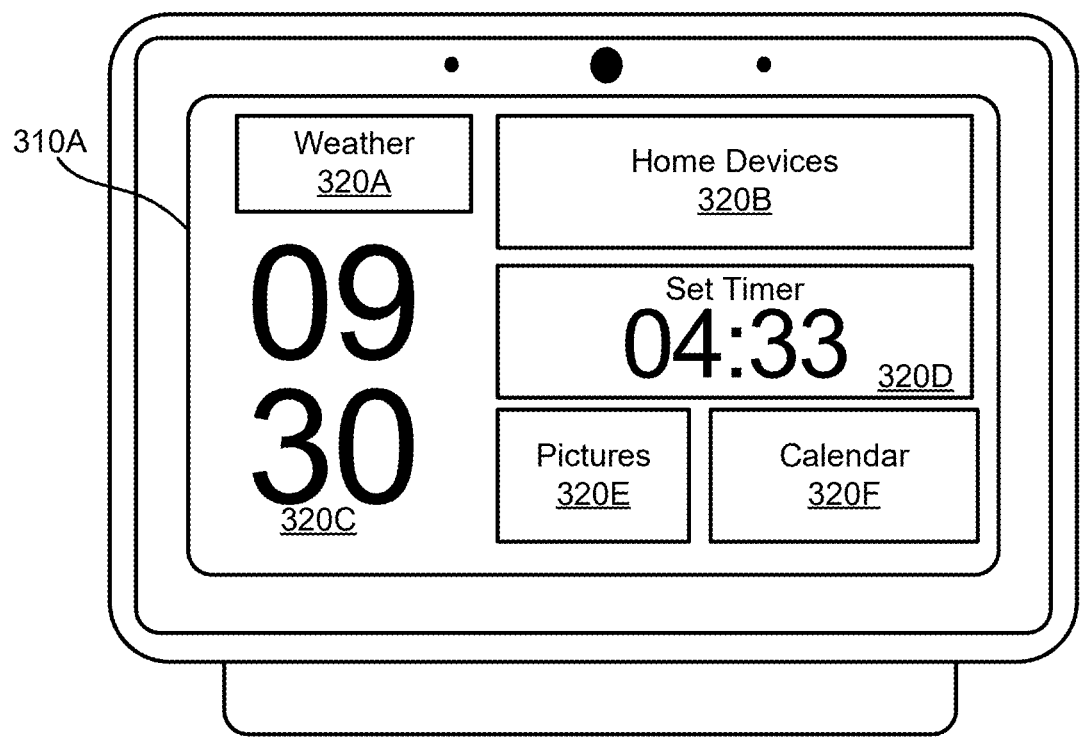
FIG. 3A illustrates an example display of a computing device while in docked mode, according to some embodiments.

FIG. 3A illustrates an example display of a computing device 101 while in docked mode, according to some embodiments. As illustrated, home panel 310A shows a weather UI element 320A, a home devices UI element 320B, a time UI element 320C, a timer UI element 320D, a pictures UI element 320E, and a calendar UI element 320F. The different UI elements 320 can provide text and/or graphical content. For example, the weather UI element 320A may show a graphical representation of the weather, a live view of the weather, textual content, auditory content, and the like. As another example, a camera UI element may provide a live feed of camera data.

In some examples, to set up the device 101 to use docked mode, an authorized user of the device 101, may choose the account to associate with docked mode. For instance, the account associated with the primary user can be selected. The selected account can be used to interact with other devices within the environment that are associated with the primary user of the selected account. The user associated with the selected account can also receive personalized results (e.g., based on a voice match) from the virtual assistant. As an example, the primary user may say "Hey Assistant, good morning" which can cause the docked and locked device 101 to provide (e.g., via voice and/or display) content such as one or more of the primary user's schedule, the weather, the morning commute conditions, reminders, activities, and notifications for the day ahead. At the end of the day, the user may say "Hey Assistant, good night" which can cause the device to perform one or more actions such as, but not limited to, turning off light(s) and/or television(s) and/or other electronic devices, locking the door(s), setting one or more alarms, and the like. While in docked mode, the device 101 can cause the lighting of the display 108 to match the ambient light and color, so that the brightness of the display does not disrupt the user.

As discussed above, in some examples, unauthorized users can interact with the device 101 while in docked mode but do not receive personalized results. During set up, or at some other time, the primary user may select music and video services to use while in docked mode. In some examples, a default service can be specified that will be used if the user does not specify a particular service in the input (e.g., a voice command) to the virtual assistant associated with the device 101.

When the device 101 is in the docked mode, the device 101 provides a different experience compared to when the device is in the non-docked mode. For example, instead of a single user being authorized to interact with the device 101, any numbers of users (e.g., family members, friends, . . . ) can interact with the device 101 while in docked mode. These unauthenticated users have limited access/permissions to media, smart home controls, information, and the like. For example, an unauthenticated user may be able to controls some smart devices, such as controlling televisions, cameras, security systems, lights, locks, and the like.

Figure 3B:
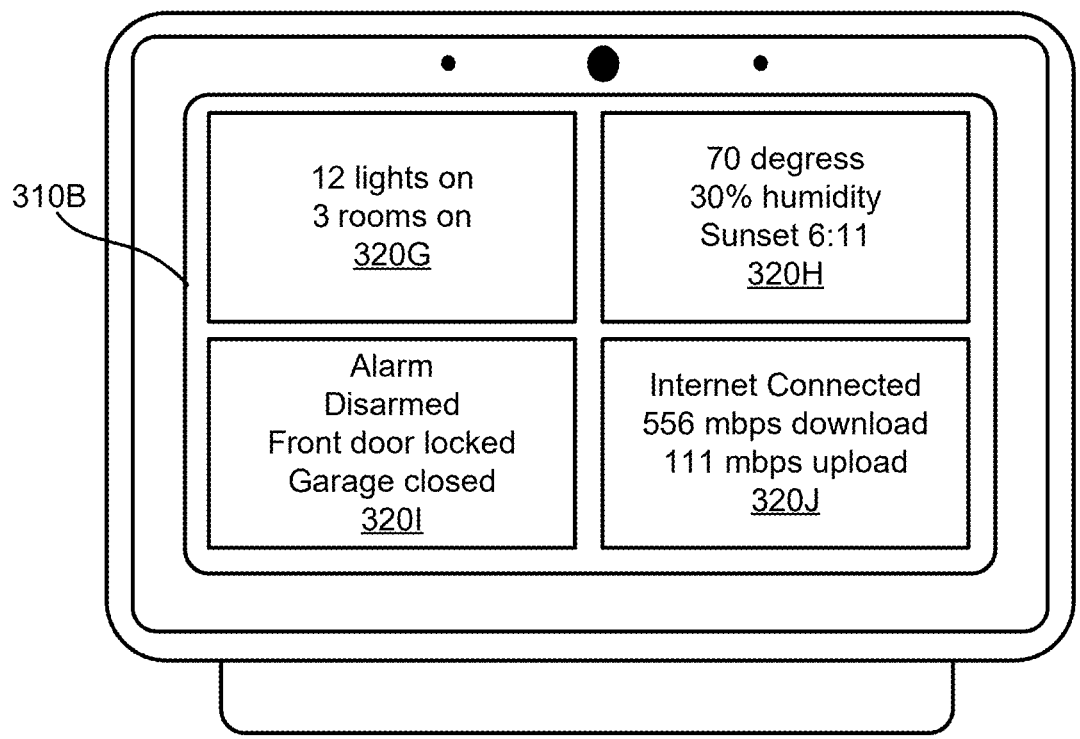
FIG. 3B illustrates an example display of a computing device while in docked mode, according to some embodiments.
Figure 3C:
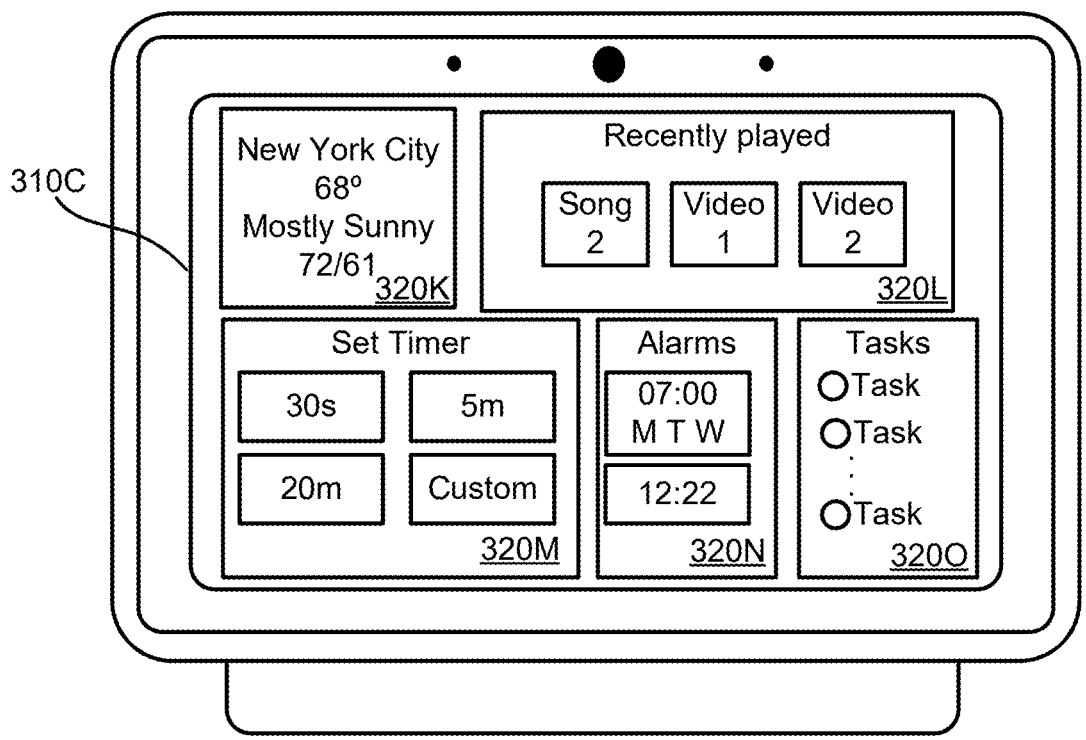
FIG. 3C illustrates an example display of a computing device while in docked mode, according to some embodiments.

FIG. 3B shows a device 101 in docked mode that includes a home panel 310B of different UI elements 320 as compared to FIG. 3A. As illustrated, display 310B shows a lights UI element 320G, a weather UI element 320H, a security UI element 320I, and a connection UI element 320J. FIG. 3C shows a device 101 in docked mode that includes a display 310C of different UI elements 320 as compared to FIG. 3A and FIG. 3B. As illustrated, display 310C shows a weather UI element 320K, recently played UI elements 320L, timer UI elements 320M, alarm UI elements 320N, and tasks UI elements 320O.

Figure 3D:
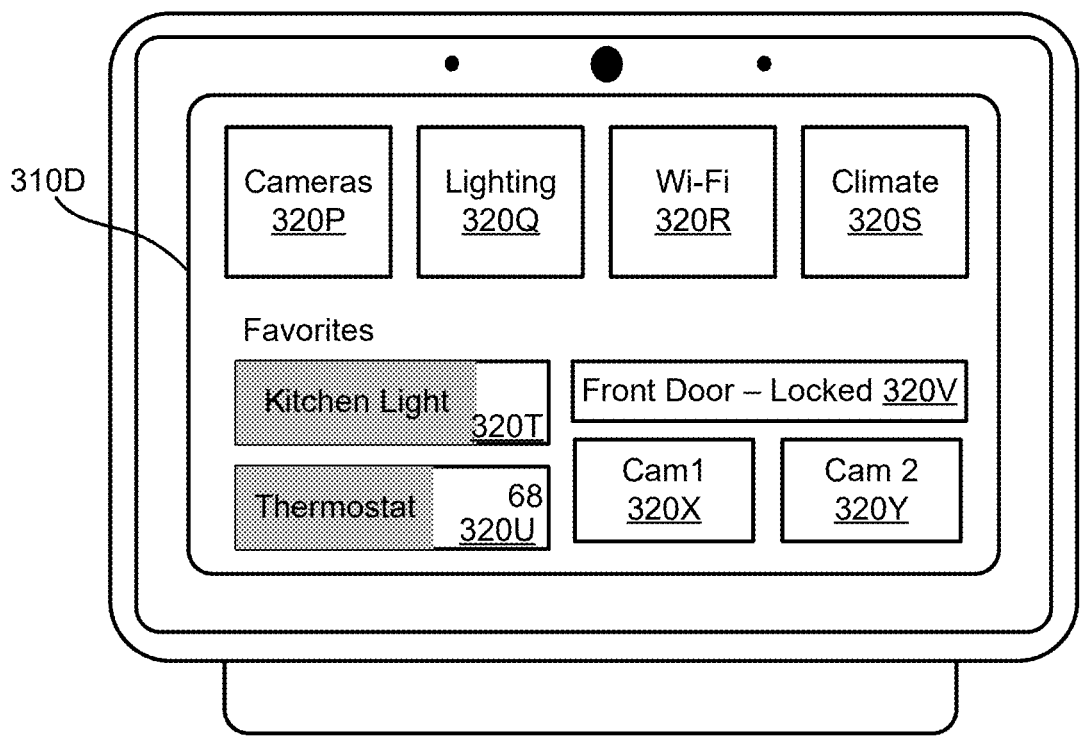
FIG. 3D illustrates an example display of a computing device while in docked mode, according to some embodiments.

FIG. 3D shows a device 101 in docked mode that includes a display 310D of different UI elements 320 as compared to FIG. 3A, FIGS. 3B, and 3C. As illustrated, display 310D shows a cameras UI element 320P, a lighting UI element 320Q, a Wi-Fi UI elements 320R, a climate UI element 320S, kitchen light UI element 320T, a thermostat UI element 320U, a front door locked UI element 320V, a camera 1 UI element 320X, and a camera 2 UI elements 320Y. Generally, an authorized user can configure displays 310 to include access to the selected functionality while the device 101 is in docked mode.

Figure 4:
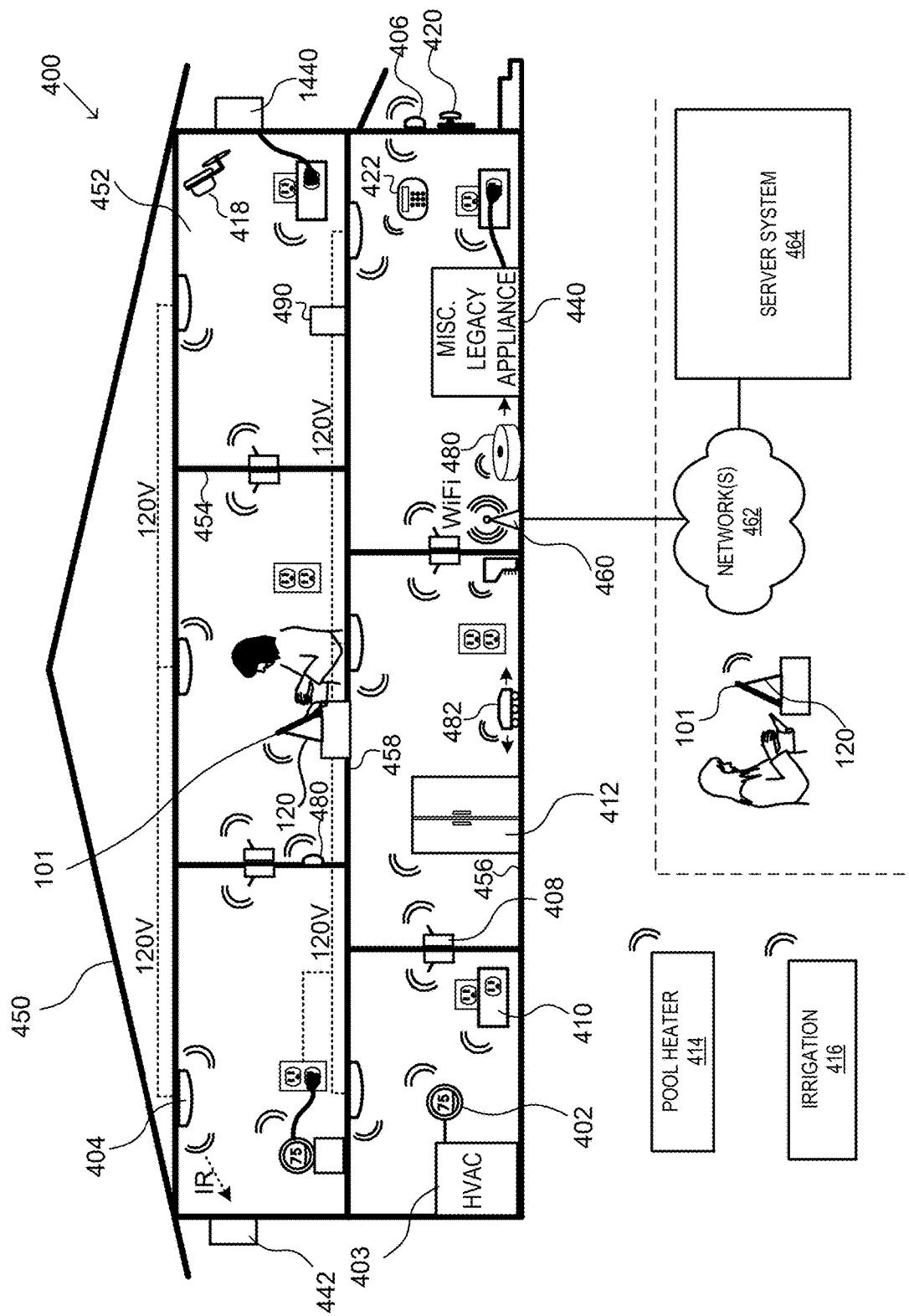
FIG. 4 is an example of a smart-home environment within which one or more of the devices, methods, systems, services, and/or computer program products described further herein will be applicable, according to some embodiments.

FIG. 4 illustrates an example smart-home environment 400, according to some embodiments. The smart-home environment 400 includes a structure 450 (e.g., a house, office building, garage, or mobile home) with various integrated devices. It will be appreciated that devices may also be integrated into a smart-home environment 400 that does not include an entire structure 450, such as an apartment, condominium, or office space. Further, the smart-home environment 400 may control and/or be coupled to devices outside of the actual structure 450. Indeed, several devices in the smart-home environment 400 need not be physically within the structure 450. For example, a device controlling a pool heater 414 or irrigation system 416 may be located outside of the structure 450.

The term "smart-home environment" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or workspace. Similarly, while the terms user, customer, installer, homeowner, occupant, guest, tenant, landlord, repair person, etc., may be used to refer to a person or persons acting in the context of some situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, as well as being one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the implementations, such an identity should not be construed in the descriptions that follow as necessarily limiting the scope of the present teachings to those individuals having those identities.

The depicted structure 450 includes a plurality of rooms 452, separated at least partly from each other via walls 454. The walls 454 may include interior walls or exterior walls. Each room may further include a floor 456 and a ceiling 458. Devices may be mounted on, integrated with and/or supported by a wall 454, floor 456, or ceiling 458.

In some implementations, the integrated devices of the smart-home environment 400 include intelligent, multi-sensing, network-connected devices that integrate seamlessly with each other in a smart-home network and/or with a central server or a cloud-computing system to provide a variety of useful smart-home functions. The smart-home environment 400 may include one or more intelligent, multi-sensing, network-connected thermostats 402 (hereinafter referred to as "smart thermostats 402"), one or more intelligent, network-connected, multi-sensing hazard detection units 404 (hereinafter referred to as "smart hazard detectors 404"), one or more intelligent, multi-sensing, network-connected entryway interface devices 406 and 420 (hereinafter referred to as "smart doorbells 406" and "smart door locks 420"), one or more intelligent, multi-sensing, network-connected alarm systems 422 (hereinafter referred to as "smart alarm systems 422"), and one or more other intelligent, network-connected devices. The smart-home environment 400 may also include other smart home devices/controls, such as but not limited to monitoring systems (e.g., baby monitoring systems, elderly monitoring systems, handicapped monitoring systems, . . . ), home entertainment controls, energy conservation devices/controls, home control devices/controls, remote home management and monitoring devices/controls, safety.

In some implementations, the one or more smart thermostats 402 detect ambient climate characteristics (e.g., temperature and/or humidity) and control a HVAC system 403 accordingly. For example, a respective smart thermostat 402 includes an ambient temperature sensor.

The one or more smart hazard detectors 404 may include thermal radiation sensors directed at respective heat sources (e.g., a stove, oven, other appliances, a fireplace, etc.). For example, a smart hazard detector 404 in a kitchen 453 may include a thermal radiation sensor directed at a stove/oven 412. A thermal radiation sensor may determine the temperature of the respective heat source (or a portion thereof) at which it is directed and may provide corresponding blackbody radiation data as output.

The smart doorbell 406 and/or the smart door lock 420 may detect a person's approach to or departure from a location (e.g., an outer door), control doorbell/door locking functionality (e.g., receive user inputs from a portable electronic device 101 (e.g., while device 101 is docked, or while device 101 is undocked) to actuate bolt of the smart door lock 420), announce a person's approach or departure via audio or visual devices, and/or control settings on a security system (e.g., to activate or deactivate the security system when occupants go and come). In some implementations, the smart doorbell 406 may include some or all of the components and features of the camera 418. In some implementations, the smart doorbell 406 includes a camera 418.

The smart alarm system 422 may detect the presence of an individual within close proximity (e.g., using built-in IR sensors), sound an alarm (e.g., through a built-in speaker, or by sending commands to one or more external speakers), and send notifications to entities or users within/outside of the smart-home network 400. In some implementations, the smart alarm system 422 also includes one or more input devices or sensors (e.g., keypad, biometric scanner, NFC transceiver, microphone) for verifying the identity of a user, and one or more output devices (e.g., display, speaker) for providing notifications. In some implementations, the smart alarm system 422 may also be set to an "armed" mode, such that detection of a trigger condition or event causes the alarm to be sounded unless a disarming action is performed.

In some implementations, the smart-home environment 400 may include one or more intelligent, multi-sensing, network-connected wall switches 408 (hereinafter referred to as "smart wall switches 408"), along with one or more intelligent, multi-sensing, network-connected wall plug interfaces 410 (hereinafter referred to as "smart wall plugs 410"). The smart wall switches 408 may detect ambient lighting conditions, detect room-occupancy states, and control a power and/or dim state of one or more lights. In some instances, smart wall switches 408 may also control a power state or speed of a fan, such as a ceiling fan. The smart wall plugs 410 may detect occupancy of a room or enclosure and control supply of power to one or more wall plugs (e.g., such that power is not supplied to the plug if nobody is at home).

In some implementations, the smart-home environment 400 of FIG. 4 may include a plurality of intelligent, multi-sensing, network-connected appliances 412 (hereinafter referred to as "smart appliances 412"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home.

Such communication by the appliance to the smart home may be facilitated by either a wired or wireless communication protocol. The smart home may also include a variety of non-communicating legacy appliances 440, such as older-model conventional washers/dryers, refrigerators, and/or the like, which may be controlled by smart wall plugs 410. The smart-home environment 400 may further include a variety of partially communicating legacy appliances 442, such as infrared ("IR") controlled wall air conditioners or other IR-controlled devices, which may be controlled by IR signals provided by the smart hazard detectors 404, hand-held remote controls, key FOBs, or the smart wall switches 408.

In some implementations, the smart-home environment 400 may include one or more network-connected cameras 418 that are configured to provide video monitoring and security in the smart-home environment 400. The cameras 418 may be used to determine the occupancy of the structure 450 and/or particular rooms 452 in the structure 450, and thus may act as occupancy sensors. For example, video captured by the cameras 418 may be processed to identify the presence of an occupant in the structure 450 (e.g., in a particular room 452). Specific individuals may be identified based, for example, on their appearance (e.g., height, face) and/or movement (e.g., their walk/gait). Cameras 418 may additionally include one or more sensors (e.g., IR sensors, motion detectors), input devices (e.g., microphone for capturing audio), and output devices (e.g., speaker for outputting audio). In some implementations, the cameras 418 may each be configured to operate in a day mode and in a low-light mode (e.g., a night mode). In some implementations, the cameras 418 each include one or more IR illuminators for providing illumination while the camera is operating in the low-light mode. In some implementations, the cameras 418 include one or more outdoor cameras. In some implementations, the outdoor cameras include additional features and/or components such as weatherproofing and/or solar ray compensation.

The smart-home environment 400 may additionally or alternatively include one or more other occupancy sensors (e.g., the smart doorbell 406, smart door locks 420, touch screens, IR sensors, microphones, ambient light sensors, motion detectors, smart nightlights 470, etc.). In some implementations, the smart-home environment 400 may include radio-frequency identification (RFID) readers (e.g., in each room 452 or a portion thereof) that determine occupancy based on RFID tags located on or embedded in occupants. For example, RFID readers may be integrated into the smart hazard detectors 404, and RFID tags may be attached to clothing, and/or integrated in hand-held devices such as a smart phone.

The smart-home environment 400 may also include communication with devices outside of the physical home but within a proximate geographical range of the home. For example, the smart-home environment 400 may include a pool heater monitor 414 that communicates a current pool temperature to other devices within the smart-home environment 400 and/or receives commands for controlling the pool temperature. Similarly, the smart-home environment 400 may include an irrigation monitor 416 that communicates information regarding irrigation systems within the smart-home environment 400 and/or receives control information for controlling such irrigation systems.

By virtue of network connectivity, one or more of the smart home devices of FIG. 4 may further allow a user to interact with the device even if the user is not proximate to the device. For example, a user may communicate with a device using a computer (e.g., a desktop computer, laptop computer, or tablet) or some other portable electronic device, such as device 101 (e.g., a tablet, smart phone, . . . ). In some examples, the device 101 is docked to a dock 120. A webpage or application may be configured to receive communications from the user and control the device based on the communications and/or to present information about the device's operation to the user. For example, the user may view a current set point temperature for a device (e.g., a stove) and adjust it using a computer.

The user may be in the structure during this remote communication or outside the structure.

As discussed above, users may control smart devices in the smart-home environment 400 using a network-connected computer or portable electronic device 101. In some examples, some or all of the occupants (e.g., individuals who live in the home) may register their device 101 with the smart-home environment 400. Such registration may be made at a central server to authenticate the occupant and/or the device as being associated with the home and to give permission to the occupant to use the device to control the smart devices in the home. An occupant may use their registered device 101 to remotely control the smart devices of the home, such as when the occupant is at work or on vacation. As discussed above, using the techniques described herein unauthorized users may also use device 101 when docked to dock 120 to remotely control one or more of the smart devices. The occupant may also use their registered device to control the smart devices when the occupant is actually located inside the home, such as when the occupant is sitting on a couch inside the home. It should be appreciated that instead of or in addition to registering devices 101, the smart-home environment 400 may make inferences about (1) which individuals live in the home and are therefore occupants, and (2) which devices 101 are associated with those individuals. As such, the smart-home environment may "learn" who is an occupant and permit the devices 101 associated with those individuals to control the smart devices of the home.

In some implementations, in addition to containing processing and sensing capabilities, devices 402, 404, 406, 408, 410, 412, 414, 416, 418, 420, and/or 422 (collectively referred to as "the smart devices" or "the smart-home devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices may serve as wireless or wired repeaters. In some implementations, a first one of the smart devices communicates with a second one of the smart devices via a wireless router. The smart devices may further communicate with each other via a connection (e.g., network interface 460) to a network, such as the Internet 462. Through the Internet 462, the smart devices may communicate with a server system 464 (also called a central server system and/or a cloud-computing system herein). The server system 464 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 464 to smart devices (e.g., when available, when purchased, or at routine intervals).

In some implementations, the network interface 460 includes a conventional network device (e.g., a router), and the smart-home environment 400 of FIG. 4 includes a hub device 480 that is communicatively coupled to the network(s) 462 directly or via the network interface 460. The hub device 480 may be further communicatively coupled to one or more of the above intelligent, multi-sensing, network-connected devices (e.g., smart devices of the smart-home environment 400). Each of these smart devices optionally communicates with the hub device 480 using one or more radio communication networks available at least in the smart-home environment 400 (e.g., ZigBee, Z-Wave, Insteon, Bluetooth, Wi-Fi and other radio communication networks). In some implementations, the hub device 480 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends the capabilities of low-capability smart devices to match the capabilities of the highly capable smart devices of the same type, integrates functionality of multiple different device types—even across different communication protocols, and is configured to streamline adding of new devices and commissioning of the hub device. In some implementations, hub device 480 further comprises a local storage device for storing data related to, or output by, smart devices of smart-home environment 400. In some implementations, the data includes one or more of: video data output by a camera device, metadata output by a smart device, settings information for a smart device, usage logs for a smart device, and the like.

In some implementations, smart-home environment 400 includes a local storage device 490 for storing data related to, or output by, smart devices of smart-home environment 400. In some implementations, the data includes one or more of: video data output by a camera device (e.g., camera 418), metadata output by a smart device, settings information for a smart device, usage logs for a smart device, and the like. In some implementations, local storage device 490 is communicatively coupled to one or more smart devices via a smart home network. In some implementations, local storage device 490 is selectively coupled to one or more smart devices via a wired and/or wireless communication network. In some implementations, local storage device 490 is used to store video data when external network conditions are poor. For example, local storage device 490 is used when an encoding bitrate of camera 418 exceeds the available bandwidth of the external network (e.g., network(s) 462). In some implementations, local storage device 490 temporarily stores video data from one or more cameras (e.g., camera 418) prior to transferring the video data to a server system (e.g., server system 464). In some implementations, the smart-home environment 400 includes service robots 468 that are configured to carry out, in an autonomous manner, any of a variety of household tasks. In some instances, a user may interact with a device 101 that is docked to dock 120 using touch input, or some other type of input, such as voice input.

Figure 5:
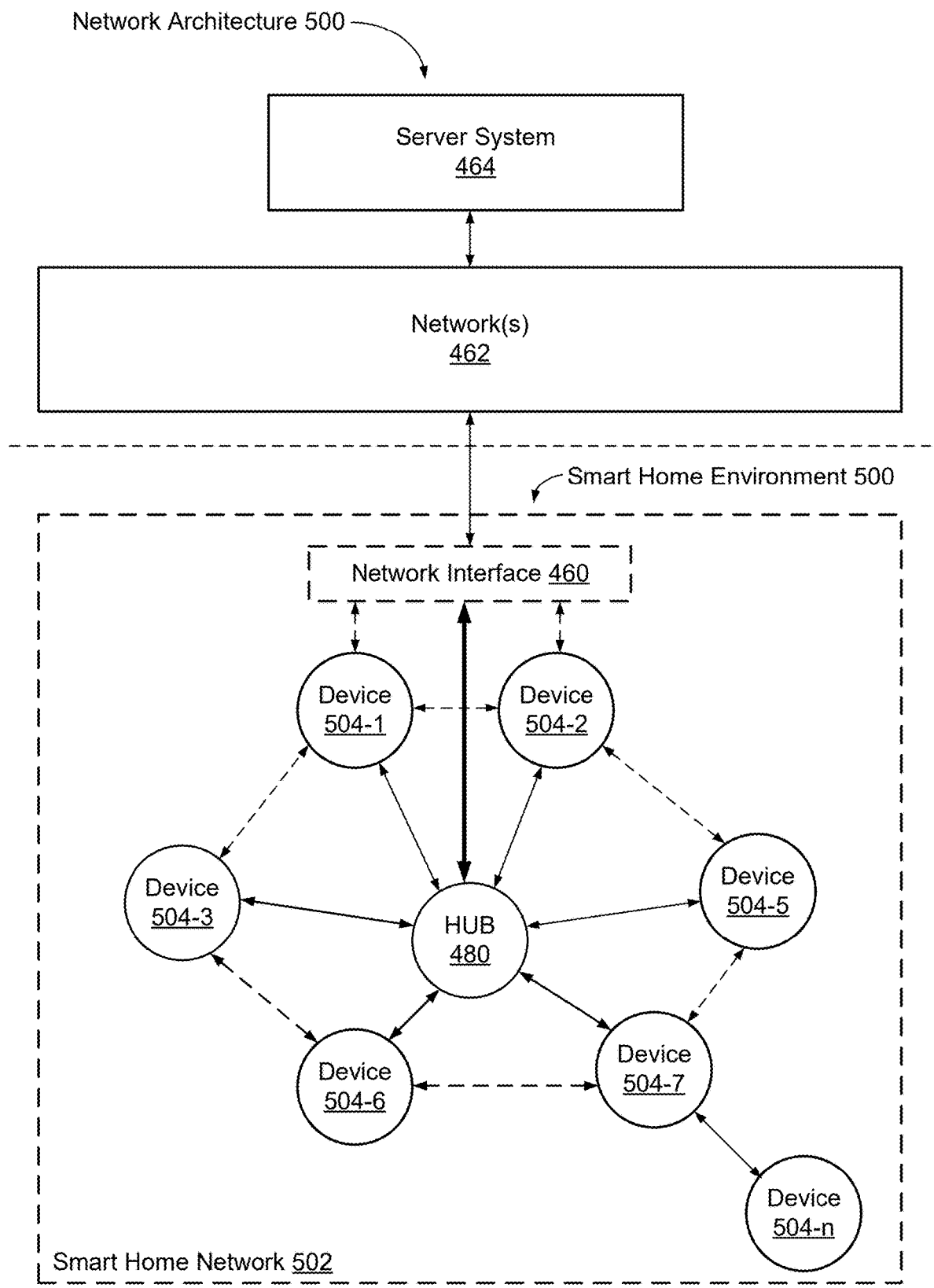
FIG. 5 illustrates a simplified block diagram of a representative network architecture that includes a smart-home network in accordance, according to some embodiments.

FIG. 5 illustrates a simplified block diagram of a representative network architecture 500 that includes a smart home network 502 in accordance with some implementations. In some implementations, the smart devices 504 in the smart-home environment 500 (e.g., devices 502, 504, 506, 508, 510, 512, 514, 516, 518, 520, and/or 522) combine with the hub device 480 to create a mesh network in smart home network 502. In some implementations, one or more smart devices 504 in the smart home network 502 operate as a smart home controller. Additionally, and/or alternatively, hub device 580 operates as the smart home controller. In some implementations, a smart home controller has more computing power than other smart devices. In some implementations, a smart home controller processes inputs (e.g., from smart devices 504, electronic device 101, and/or server system 464) and sends commands (e.g., to smart devices 504 in the smart home network 502) to control operation of the smart-home environment 500. In some implementations, some of the smart devices 504 in the smart home network 502 (e.g., in the mesh network) are "spokesman" nodes (e.g., 504-1) and others are "low-powered" nodes (e.g., 504-9). Some of the smart devices in the smart-home environment 500 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are typically equipped with the capability of using a wireless protocol to facilitate bidirectional communication with a variety of other devices in the smart-home environment 500, as well as with the server system 564. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes may be incapable of bidirectional communication. These low-power nodes may send messages, but they are unable to "listen." Thus, other devices in the smart-home environment 500, such as the spokesman nodes, need not send information to these low-power nodes. In some implementations, some low-power nodes are capable of only a limited bidirectional communication. For example, other devices can communicate with the low-power nodes only during a certain time period.

In some implementations, the smart devices may serve as low-power and spokesman nodes to create a mesh network in the smart-home environment 500. In some implementations, individual low-power nodes in the smart-home environment may regularly send out messages regarding what they are sensing, and the other low-powered nodes in the smart-home environment—in addition to sending out their own messages—may forward these messages, thereby causing the messages to travel from node to node (i.e., device to device) throughout the smart home network 502. In some implementations, the spokesman nodes in the smart home network 502, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 564 (using, e.g., the relatively high-power communication protocol). Thus, the low-powered nodes using low-power communication protocols can send and/or receive messages across the entire smart home network 502, as well as over the Internet 462 to the server system 464. In some implementations, the mesh network enables the server system 464 to regularly receive data from most or all of the smart devices in the home, make inferences based on the data, facilitate state synchronization across devices within and outside of the smart home network 502, and send commands to one or more of the smart devices to perform tasks in the smart-home environment.

The spokesman nodes and some of the low-powered nodes are capable of "listening." Accordingly, users, other devices, and/or the server system 464 may communicate control commands to the low-powered nodes. For example, a user may use the electronic device 101 (e.g., a docked tablet computing device) to send commands over the Internet to the server system 464, which then relays the commands to one or more spokesman nodes in the smart home network 502. The spokesman nodes may use a low-power protocol to communicate the commands to the low-power nodes throughout the smart home network 502, as well as to other spokesman nodes that did not receive the commands directly from the server system 564.

In some implementations, a smart device 504, e.g., a nightlight is a low-power node. In addition to housing a light source, the smart nightlight can house an occupancy sensor, such as an ultrasonic or passive IR sensor, and an ambient light sensor, such as a photo resistor or a single-pixel sensor that measures light in the room. In some implementations, the smart nightlight is configured to activate the light source when its ambient light sensor detects that the room is dark and when its occupancy sensor detects that someone is in the room. In other implementations, the smart nightlight is simply configured to activate the light source when its ambient light sensor detects that the room is dark. Further, in some implementations, the smart nightlight includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As described above, these messages may be sent wirelessly (e.g., using the mesh network) from node to node (i.e., smart device to smart device) within the smart home network 502 as well as over the Internet 462 to the server system 464.

Other examples of low-power nodes include battery-operated versions of the smart hazard detectors 404. These smart hazard detectors 404 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 404 may send messages that correspond to each of the respective sensors to the other devices and/or the server system 464, such as by using the mesh network as described above.

Examples of spokesman nodes include smart doorbells 406, smart thermostats 402, smart wall switches 408, and smart wall plugs 410. These devices are often located near and connected to a reliable power source, and therefore may include more power-consuming components, such as one or more communication chips capable of bidirectional communication in a variety of protocols.

As explained above with reference to FIG. 4, in some implementations, the smart-home environment 400 of FIG. 4 includes a hub device 480 that is communicatively coupled to the network(s) 462 directly or via the network interface 460. The hub device 480 is further communicatively coupled to one or more of the smart devices using a radio communication network that is available at least in the smart-home environment 400. Communication protocols used by the radio communication network include, but are not limited to, ZigBee, Z-Wave, Insteon, EuOcean, Thread, OSIAN, Bluetooth Low Energy and the like. In some implementations, the hub device 480 not only converts the data received from each smart device to meet the data format requirements of the network interface 460 or the network(s) 462, but also converts information received from the network interface 460 or the network(s) 462 to meet the data format requirements of the respective communication protocol associated with a targeted smart device. In some implementations, in addition to data format conversion, the hub device 480 further processes the data received from the smart devices or information received from the network interface 460 or the network(s) 462 preliminary. For example, the hub device 480 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 460 and the hub device 480 are integrated to one network device. Functionality described herein is representative of particular implementations of smart devices, control application(s) running on representative electronic device(s) (such as a smart phone), hub device(s) 480, and server(s) coupled to hub device(s) via the Internet or other Wide Area Network (WAN). All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 6:
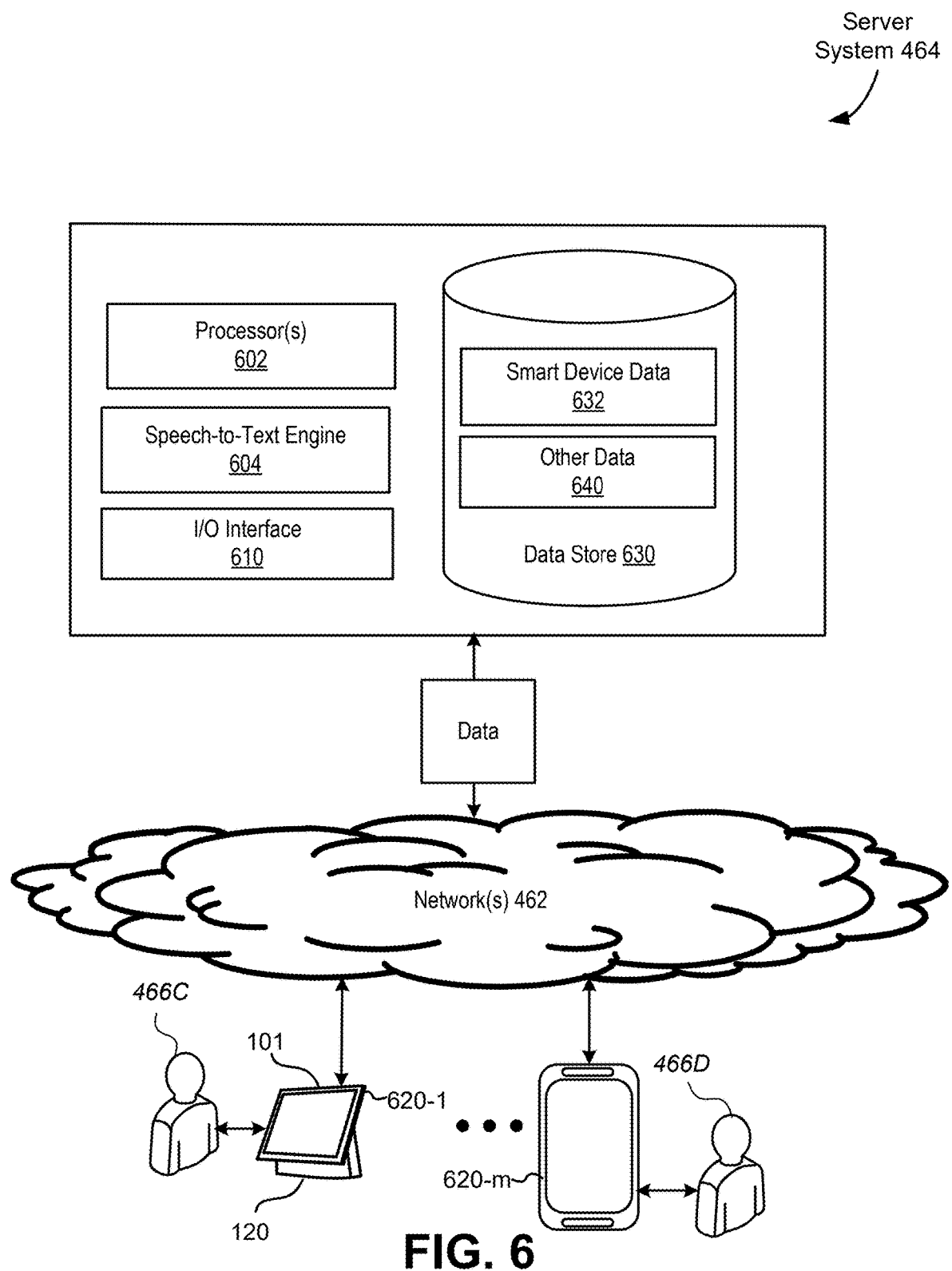
FIG. 6 illustrates a simplified operating environment in which a server system interacts with client devices and smart devices and provides processing associated with user access to functionality of a docked computing device, according to some embodiments.

FIG. 6 illustrates a representative operating environment in which a server system 464 interacts with client devices and smart devices and provides processing associated with user access to functionality of a docked computing device. As shown in FIG. 6, the server system 464 receives input from client devices 620. For example, the electronic device 101 illustrated in FIG. 1 is an example of a client device 620.

In accordance with some implementations, each of the client devices 620 includes a client-side module. The client-side module communicates with a server-side module executed on the server system 464 through the one or more networks 462. The client-side module provides client-side functionality for communications with the server-side module. The server-side module provides server-side functionality for communication with client-side modules, and/or performing other functionality.

In some implementations, the server system 464 includes one or more processors 602, a speech-to-text engine 604, a data store 630, and an I/O interface 610. The I/O interface 610 facilitates the client-facing input and output processing. The data store 630 stores different information, such as smart device data 632 associated with smart devices in different environments, other data 640, and the like.

Examples of a representative client device 620 include a tablet computer, a handheld computer, a wearable computing device, a personal digital assistant (PDA), a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 462 include local area networks (LAN) and wide area networks (WAN) such as the Internet. The one or more networks 462 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

In some implementations, the server system 464 may be implemented on one or more standalone data processing apparatuses or a distributed network of computers. In some implementations, the server system 464 also employs various virtual devices and/or services of third-party service providers (e.g., third-party cloud service providers) to provide the underlying computing resources and/or infrastructure resources of the server system 464. In some implementations, the server system 464 includes, but is not limited to, a server computer, a handheld computer, a tablet computer, a laptop computer, a desktop computer, or a combination of any two or more of these data processing devices or other data processing devices.

The server-client environment shown in FIG. 6 includes both a client-side portion (e.g., the client-side module) and a server-side portion (e.g., the server-side module). The division of functionality between the client and server portions of operating environment can vary in different implementations. For example, in some implementations, the client-side module is a thin-client that provides only user-facing input and output processing functions, and delegates all other data processing functionality to a backend server (e.g., the server system 464). Although many aspects of the present technology are described from the perspective of the server system 464, the corresponding actions performed by a client device 620 would be apparent to one of skill in the art. Similarly, some aspects of the present technology may be described from the perspective of a client device, and the corresponding actions performed by the server would be apparent to one of skill in the art. Furthermore, some aspects of the present technology may be performed by the server system 464, and a client device 620.

Figure 7:
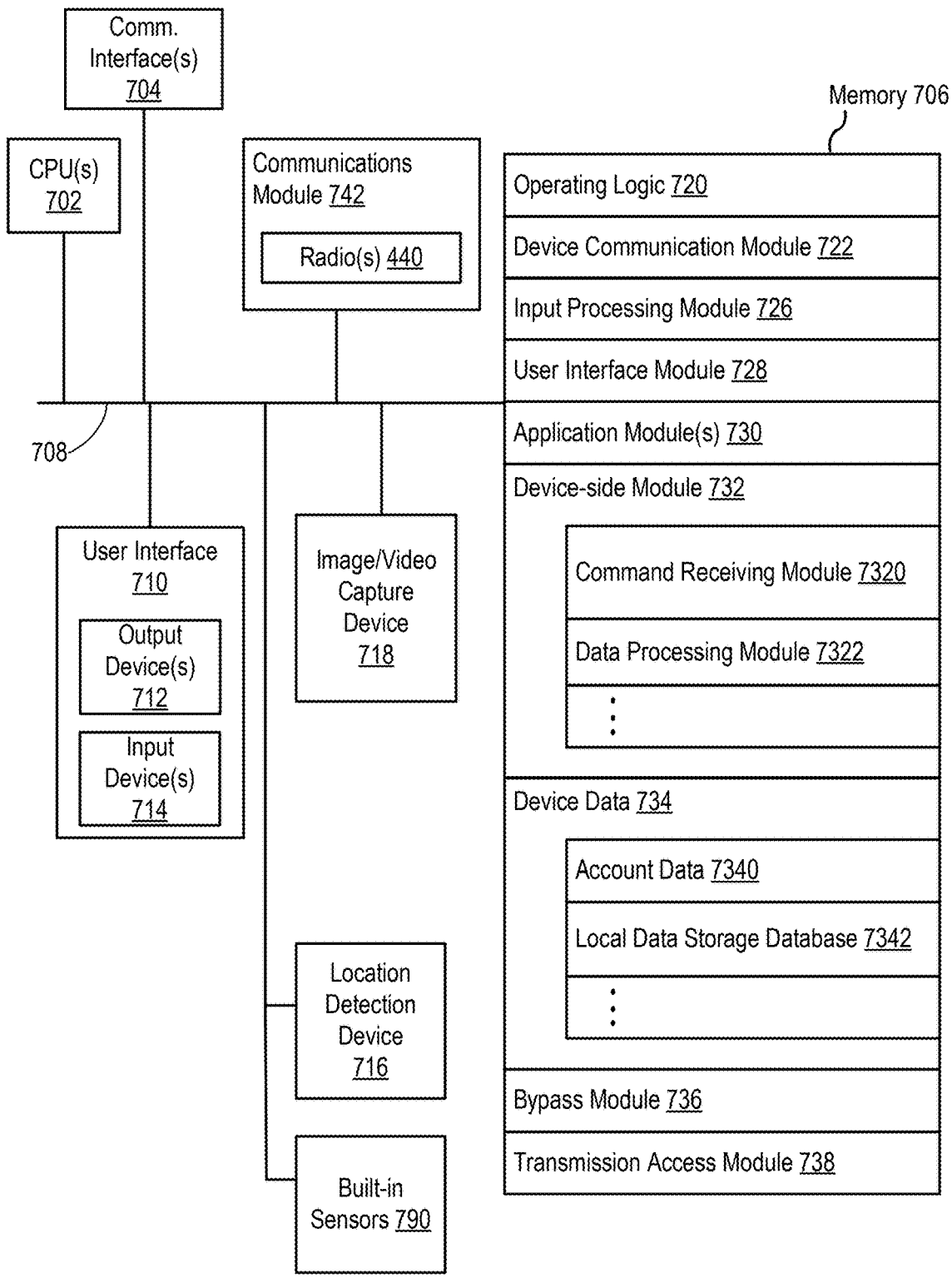
FIG. 7 illustrates a simplified block diagram of a representative smart device, according to some embodiments.

FIG. 7 is a block diagram illustrating a representative smart device 504 in accordance with some implementations. In some implementations, the smart device 504 (e.g., any devices of a smart-home environment 500, FIG. 5) includes one or more processing units (e.g., CPUs, ASICs, FPGAS, microprocessors, and the like) 702, one or more communication interfaces 704, memory 706, communications module 742 with radios 740, and one or more communication buses 708 for interconnecting these components (sometimes called a chipset). In some implementations, the user interface 710 includes one or more output devices 712 that enable presentation of media content, including one or more speakers and/or one or more visual displays. In some implementations, the user interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 504 use a microphone and voice recognition or a camera and gesture recognition to supplement or replace the keyboard. In some implementations, the smart device 504 includes one or more image/video capture devices 718 (e.g., cameras, video cameras, scanners, photo sensor units). The built-in sensors 7490 may include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 740 enable one or more radio communication networks in the smart-home environments, and allow a smart device 504 to communicate with other devices. In some implementations, the radios 740 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 704 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/ or any of a variety of custom or standard wired protocols (e.g., Ethernet, HomePlug, etc.), or any other suitable communication protocol, including communication protocols not yet developed as of the filing date of this document.

The memory 706 includes high-speed random-access memory, such as DRAM, SRAM, DDR RAM, or other random-access solid-state memory devices; and, optionally, includes non-volatile memory, such as one or more magnetic disk storage devices, one or more optical disk storage devices, one or more flash memory devices, or one or more other non-volatile solid state storage devices. The memory 706, or alternatively the non-volatile memory within the memory 706, includes a non-transitory computer readable storage medium. In some implementations, the memory 706, or the non-transitory computer readable storage medium of the memory 706, stores the following programs, modules, and data structures, or a subset or superset thereof: operating logic 720 including procedures for handling various basic system services and for performing hardware dependent tasks;

a device communication module 722 for connecting to and communicating with other network devices (e.g., network interface 160, such as a router that provides Internet connectivity, networked storage devices, network routing devices, server system 464, etc.) connected to one or more networks 462 via one or more communication interfaces 704 (wired or wireless); an input processing module 726 for detecting one or more user inputs or interactions from the one or more input devices 714 and interpreting the detected inputs or interactions; a user interface module 728 for providing and displaying a user interface in which settings, captured data, and/or other data for one or more devices (e.g., the smart device 504, and/or other devices in smart-home environment 400) can be configured and/or viewed; one or more applications 730 for execution by the smart device (e.g., games, social network applications, smart home applications, and/or other web or non-web based applications) for controlling devices (e.g., executing commands, sending commands, and/or configuring settings of the smart device 504 and/or other client/electronic devices), and for reviewing data captured by devices (e.g., device status and settings, captured data, or other information regarding the smart device 504 and/or other client/electronic devices); a device-side module 732, which provides device-side functionalities for device control, data processing and data review, including but not limited to: a command receiving module 7320 for receiving, forwarding, and/or executing instructions and control commands (e.g., from a client device 620, from a server system 464, from user inputs detected on the user interface 710, etc.) for operating the smart device 504; a data processing module 7322 for processing data captured or received by one or more inputs (e.g., input devices 714, image/video capture devices 718, location detection device 716), sensors (e.g., built-in sensors 790), interfaces (e.g., communication interfaces 704, radios 740), and/or other components of the smart device 504, and for preparing and sending processed data to a device for review (e.g., client devices 620 for review by a user); device data 734 storing data associated with devices (e.g., the smart device 504), including, but is not limited to: account data 7340 storing information related to user accounts loaded on the smart device 504, wherein such information includes cached login credentials, smart device identifiers (e.g., MAC addresses and UUIDs), user interface settings, display preferences, authentication tokens and tags, password keys, etc.; local data storage database 7342 for selectively storing raw or processed data associated with the smart device 504 (e.g., video surveillance footage captured by a camera 418); a bypass module 736 for detecting whether radio(s) 740 are transmitting signals via respective antennas coupled to the radio(s) 740 and to accordingly couple radio(s) 740 to their respective antennas either via a bypass line or an amplifier (e.g., a low noise amplifier); and a transmission access module 738 for granting or denying transmission access to one or more radio(s) 740 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 706, optionally, stores a subset of the modules and data structures identified above. Furthermore, the memory 706, optionally, stores additional modules and data structures not described above.

Figure 8:
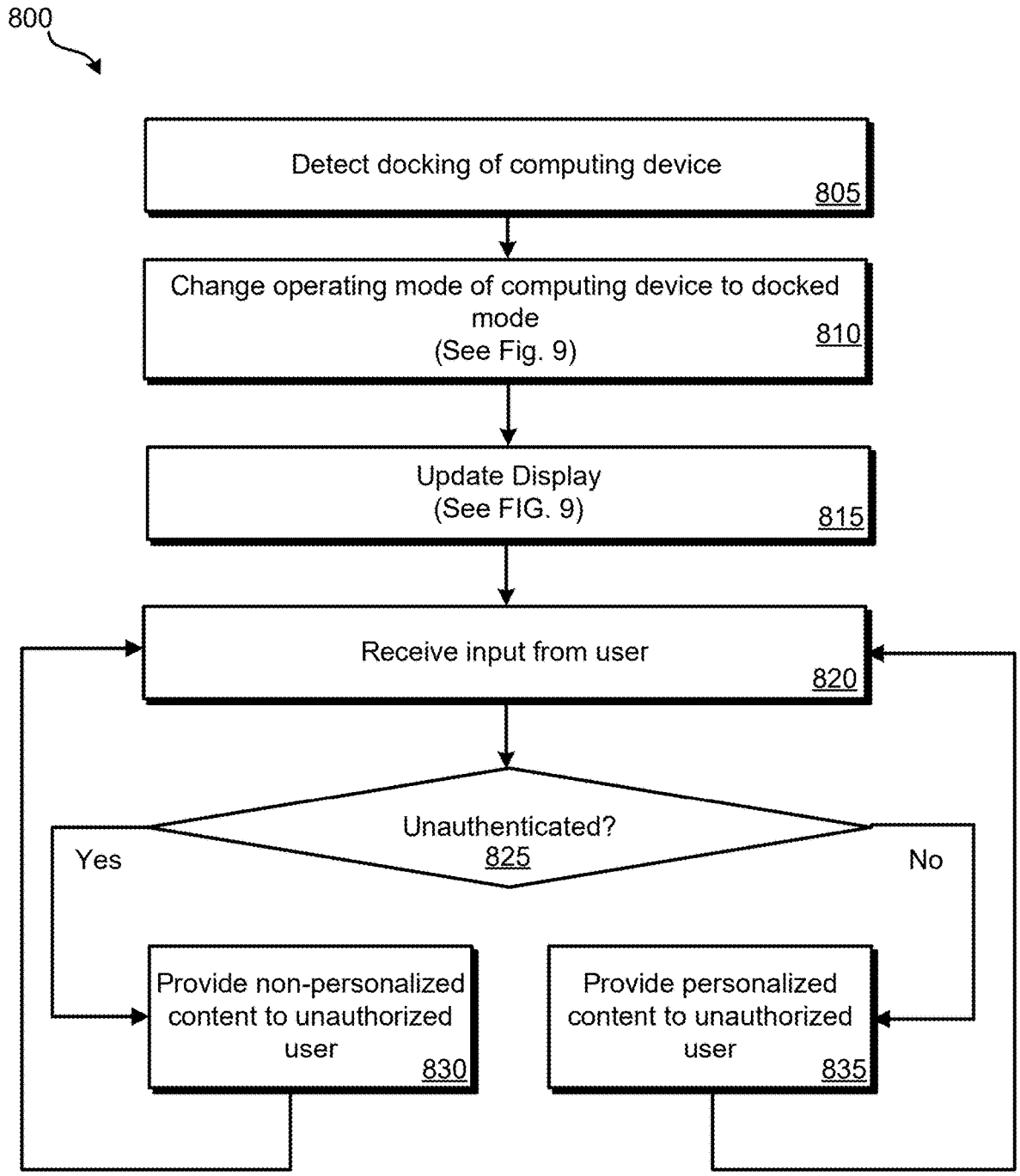
FIG. 8 illustrates an example process for interacting with a docked computing device, according to some embodiments.

Various methods may be performed using the systems, states, and arrangements detailed in relation to FIGS. 1-7. FIG. 8 illustrates an example process for an example process for interacting with a docked computing device, according to some embodiments. Method 800 can be used by the device 101 to provide functionality types while in docked mode.

At 805, the docking of the device 101 is detected. As discussed above, the docking engine 116 can determine that the device 101 has been docked to a dock 120.

At 810, the operating mode of the device 101 is changed to the docked mode. As discussed above, the docking manager 116 can detect the docking of computing device 101 to dock 120. In some cases, the docking manager 116 can also determine whether the device 101 is locked. In response to detecting the docking of the device in 805, the docking manager 116 changes the operating mode of the device to the docked mode.

At 815, the display 108 is updated. As discussed above, in some examples, instead of turning off the display (e.g., when the device 101 is locked), the docking manager 116 updates the display 108 to an always-on display 108. Generally, the docking manager 116 displays different content (e.g., screen savers, home panels, notifications, . . . ) while device 101 is in docked mode. See FIG. 9 and related discussion for more details.

At 820, input is received from a user. As discussed above, both authenticated users and unauthenticated users may interact with the device 101 while in docked mode. In some cases, the input can be voice input, or touch input. In other examples, different types of input can be received from a user (e.g., stylus, gesture, keyboard, mouse, . . . ).

At 825, a determination is made as to whether the input is received from an authorized user or an unauthorized user. As discussed above, the determination can be based on a voice of the user. In other examples, different techniques can be used to identify authenticated users. When the input is determined to come from an authenticated user, the process moves to 830. When the input is determined to come from an unauthenticated user, the process moves to 835.

At 830, non-personalized content is provided to an unauthorized user. As discussed above, unauthenticated users can access some of the functionality types of device 101 without having access to private user data and/or all functionality types associated with an authenticated user of the device 101. Generally, unauthenticated users are isolated from authenticated users' data and/or applications/services.

At 835, personalized content is provided to an authorized user. As discussed above, when an authorized user is identified (e.g., voice match), personalized content can be provided to the user.

Figure 9:
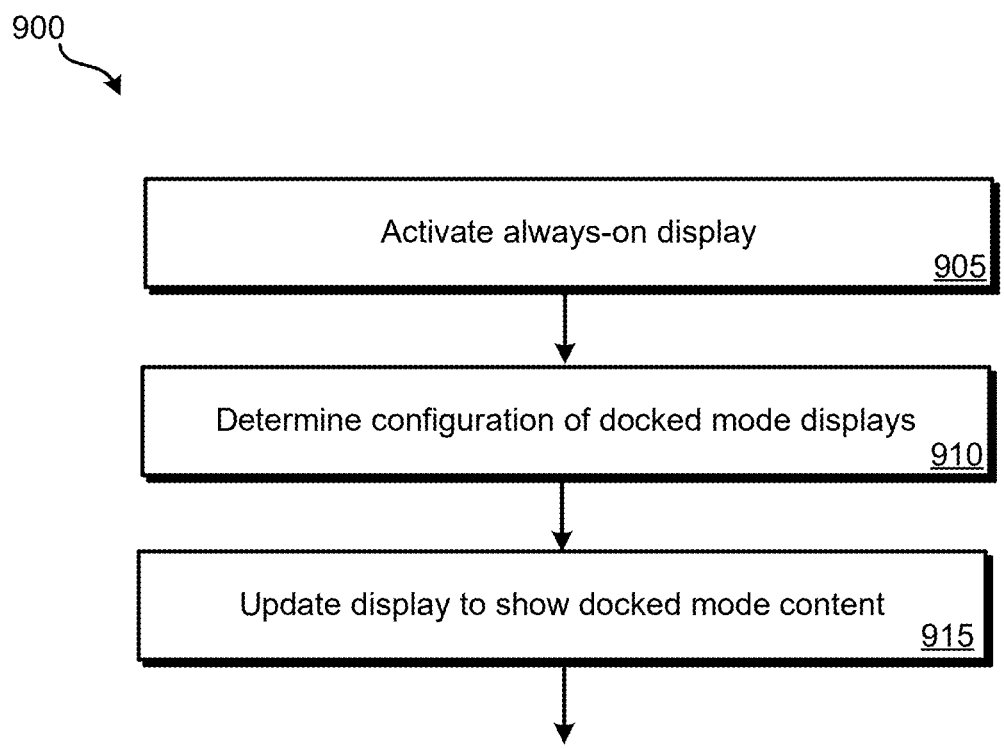
FIG. 9 illustrates an example process for updating a display when a computing device is in docked mode, according to some embodiments.

FIG. 9 illustrates an example process 900 for updating a display when a computing device is in docked mode, according to some embodiments. Method 900 can be used by the device 101, dock 120, and/or some other device.

At 905, the display is updated to be an always-on display. As briefly discussed above, instead of turning off the display 108 when not in use, the docking manager 116 changes the display mode to an always-on display mode such that the display 108 remains on while in docked mode. In some examples, the display mode can be set to an always on display mode even when the device is not connected to power.

At 910, the IMU data 130 is accessed. As discussed above, an IMU system 128 of the dock 120 can be configured to generate IMU data 130 during times the dock 120 detects that the stylus is in use.

At 915, the display 108 is updated to show the docked mode content. As discussed above, the docked mode content can include but is not limited to screensavers with/without a visible shortcut UI element to access a home panel, one or more displays with one or more UI elements, and the like.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:
   detecting that a tablet computing device is docked to a docking device;
   in response to detecting that the tablet computing device is docked, changing an operating mode setting of the tablet computing device to a docked mode that allows one or more unauthenticated users to interact with the tablet computing device during a time the tablet computing device is in a locked state;
   receiving input from an unauthenticated user to access an application provided by the tablet computing device; and
   causing content to be provided, using the tablet computing device, to the unauthenticated user.

2. The method of claim 1, further comprising changing a display mode of the tablet computing device to an always-on display mode in response to detecting the tablet computing device is docked.

3. The method of claim 2, further comprising displaying one or more user interface elements on the display of the tablet computing devices, wherein the one or more user interface elements are selectable by an authenticated user.

4. The method of claim 3, wherein the one or more user interface elements are associated with one or more of interacting with one or more home devices, interacting with media content, setting an alarm, setting a timer, browsing and playing audio content, adjusting one or more thermostats, browsing and playing video content, or performing a search.

5. The method of claim 1, wherein the docking device includes a power source, one or more speakers, and an interface configured to electronically connect to the tablet computing device.

6. The method of claim 1, further comprising restricting the unauthenticated user from accessing private content on the tablet computing device that is associated with an authenticated user of the tablet computing device.

7. The method of claim 1, further comprising:
determining that one or more of the tablet computing device or the docking device is located within a trusted location; and
providing access to one or more of data, applications, or services associated with the trusted location.

8. The method of claim 7, wherein the one or more of data, applications, services associated with the trusted location includes data associated with home devices that are located in an environment at the trusted location.

9. The method of claim 1, wherein receiving input from the unauthenticated user comprises receiving one or more of voice input, or touch input via the tablet computing device.

10. The method of claim 1, further comprising receiving second input from an authenticated user; and outputting personalized content for the authenticated user.

11. A system comprising:
a docking device; and
a computing device that includes:
a touch surface;
a wireless interface configure to receive and transmit wireless data from one or more smart devices; and
one or more processors configured to:
detect that the computing device is docked to the docking device;
in response to detecting that the computing device is docked, change an operating mode of the computing device to a docked mode that allows one or more unauthenticated users to interact with the computing device during a time the computing device is docked and in a locked state and change a display mode of the computing device to an always-on display mode;
receive input from an unauthenticated user to access functionality provided by the computing device; and
cause content to be provided, using the computing device, to the unauthenticated user.

12. The system of claim 11, wherein the one or more processors are further configured to display one or more user interface elements on a display associated with the computing device, wherein the one or more user interface elements are selectable by an authorized user.

13. The system of claim 12, wherein the one or more user interface elements are associated with one or more of interacting with one or more home devices, interacting with media content, setting an alarm, setting a timer, browsing and playing audio content, adjusting one or more thermostats, browsing and playing video content, or performing a search.

14. The system of claim 11, wherein the docking device includes a power source, one or more speakers, and an interface configured to electronically connect to the computing device.

15. The system of claim 11, wherein the one or more processors are further configured to restrict the unauthenticated user from accessing private content on the computing device that is associated with an authenticated user of the computing device.

16. The system of claim 11, wherein the one or more processors are further configured to:
determine that one or more of the computing device or the docking device is located within a trusted location; and
provide access to one or more of data, applications, or services associated with the trusted location.

17. The system of claim 16, wherein the one or more of data, applications, services associated with the trusted location includes data associated with home devices that are located in an environment at the trusted location.

18. The system of claim 11, wherein receiving input from the unauthenticated user comprises receiving one or more of voice input, or touch input via the computing device.

19. The system of claim 11, further comprising receiving second input from an authorized user; and outputting personalized content for the authorized user.

20. A non-transitory computer-readable medium containing computer executable instructions that, when executed by a processor, cause the processor to perform a method, the method comprising:
detecting that a tablet computing device is one or more of docked to a docking device, or in a trusted location;
in response to detecting that the tablet computing device is one or more of docked to the docking device or in the trusted location, changing an operating mode setting of the tablet computing device to a docked mode that allows one or more unauthenticated users to interact with the tablet computing device during a time the tablet computing device is docked and in a locked state;
receiving input from an unauthenticated user to access an application provided by the tablet computing device; and
causing content to be provided, using the tablet computing device, to the unauthenticated user.

* * * * *